Figure 4:
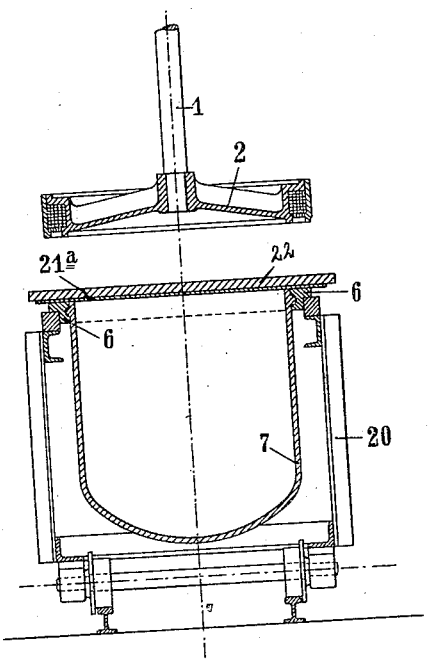

P. T. SIEVERT.
MACHINE FOR MAKING HOLLOW GLASS ARTICLES.
APPLICATION FILED JULY 29, 1909.
956,505.
Patented Apr. 26, 1910.
3 SHEETS—SHEET 1.
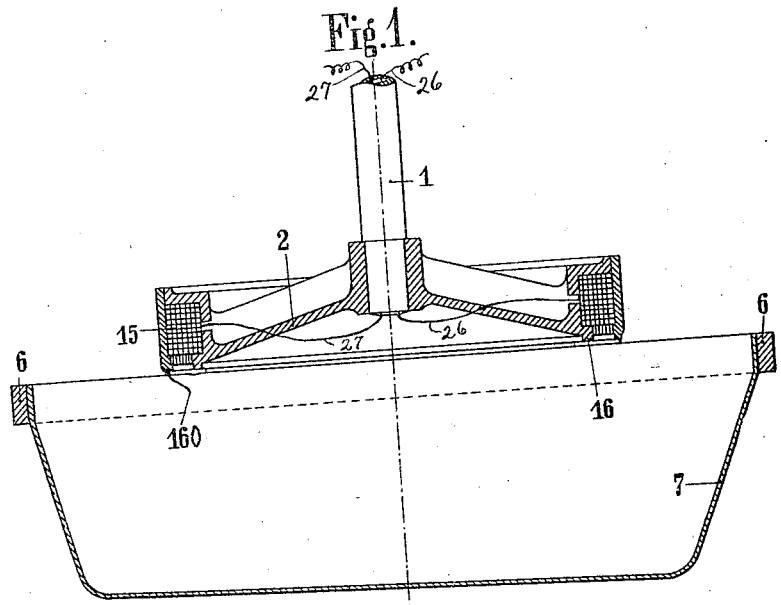
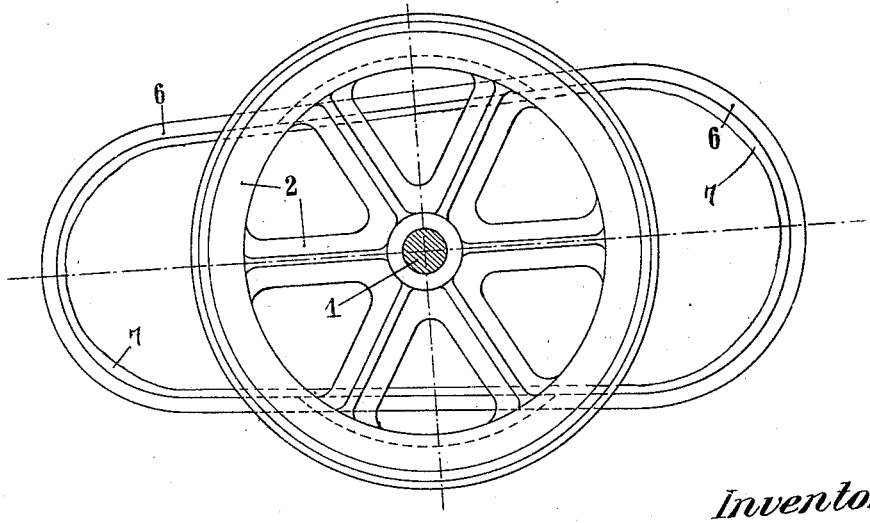
Witnesses:
S. Newman
H. D. Penney
Inventor:
Paul T. Sievert,
By his Attorney,
F. H. Richards.

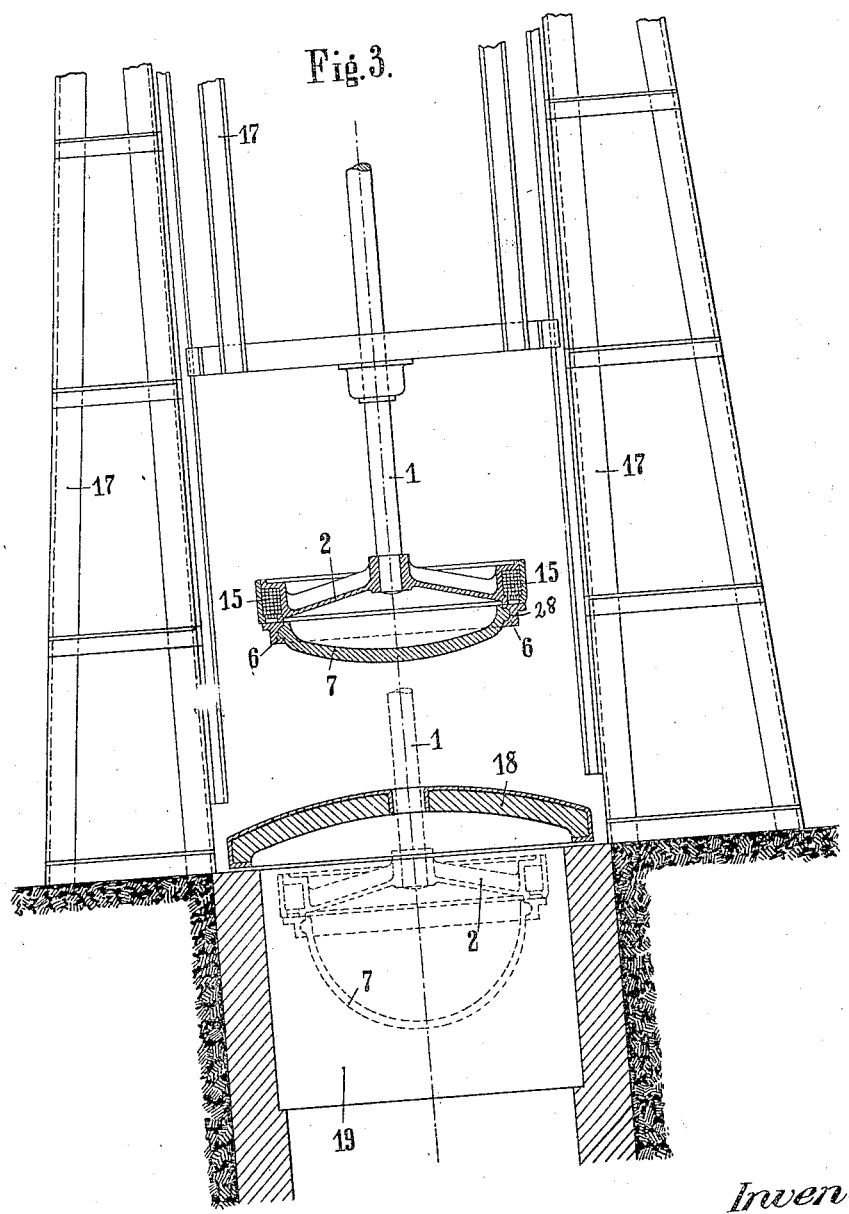

P. T. SIEVERT.
MACHINE FOR MAKING HOLLOW GLASS ARTICLES.
APPLICATION FILED JULY 29, 1909.

956,505.

Patented Apr. 26, 1910.
3 SHEETS—SHEET 3.

Witnesses:
J. Newman.
H. D. Penney.

Inventor:
Paul T. Sievert,
By his Attorney,
F. H. Richards.

UNITED STATES PATENT OFFICE.

PAUL THEODOR SIEVERT, OF DRESDEN, GERMANY.

MACHINE FOR MAKING HOLLOW GLASS ARTICLES.

956,505.  Specification of Letters Patent.  Patented Apr. 26, 1910.

Original application filed April 24, 1909, Serial No. 492,001. Divided and this application filed July 29, 1909. Serial No. 510,207.

*To all whom it may concern:*

Be it known that I, PAUL THEODOR SIEVERT, manufacturer, a subject of the King of Saxony, German Empire, residing at Nürnbergerstrasse 46, Dresden A., Kingdom of Saxony, Germany, have invented certain new and useful Improvements in Machines for Making Hollow Glass Articles, of which the following is a specification.

My invention relates generally to machines for making hollow glass articles and particularly to apparatus used in heating layers of glass or previously-shaped glass bodies carried by a frame attached to a carrier.

This application is a division of an application filed by me on April 24, 1909, for machine for making hollow glass articles, and bearing the Serial No. 492,001.

I have already shown processes of and machines for making hollow glass bodies, in which a carrying-frame holding a layer of glass or a previously-shaped glass body is connected with a head or carrier attached to a vertically-movable, preferably also revoluble, vertical shaft having an axial bore for supplying compressed air into the hollow body which is being made, as, for example in my Letters Patent 825,160 dated July 3rd, 1906.

According to one of such processes or by means of such machines the layers of glass or the previously-shaped glass bodies, which are first cooled as required, particularly in their central portions, are lowered into a heating-chamber or fire-drum under the shaft or blowing-pipe head, in order to bring the whole body to as uniform a temperature as possible, which operation is repeated as is necessary during the further treatment of the hollow body. The final shape is given to the hollow bodies by blowing them out with compressed air while they are connected by the carrying-frame with the blowing-pipe head. As in the process described in the Letters Patent 825,160 mentioned above, the hollow bodies can be blown in molds which give them the desired shape. If iron molds are used for this, it is preferable to reheat the made hollow bodies generally frequently repeatedly for a short time in the heating-chamber, in order to equalize the rapid cooling of the outer layers of glass occasioned by the iron. The frames, which according to the mentioned Letters Patent carry the glass layers or previously-shaped glass bodies, are connected with the blowing-pipe head by screws, catches or other suitable mechanical means, but preferably by electromagnetic clutch devices, when of course the windings of the electromagnet must be sufficiently heat-proof.

When this process is carried into practice with the described machines, the blowing-pipe head and the carrying-frame must of course fit one another exactly and tightly, so that no compressed air escapes at the joint. But since the form of the carrier or carrying-frame varies according to the shape of the hollow body which is to be made, for every shape of carrier a special shape of blowing-pipe head would have to be provided, and the blowing-pipe head would have to be changed each time it was wished to change from making one definite kind of hollow vessel to another kind. This substitution is of course wasteful of time each time and necessitates a very large number of different blowing-pipe heads which is a very expensive matter particularly when electromagnetic clutch devices are employed. It is true that when making cylinders for table glass the drawback is not met with, because the diameters when once fixed for such cylinders are not frequently changed. But when making other hollow vessels, of which in many instances no very large number is ordered, and in which the form of the upper rims is very different, e. g. round, oval, angular and so on, the drawback mentioned is of great significance in practice, and a primary object of my invention is to remedy the same. Namely the subject-matter of my invention is a device which renders it unnecessary to exchange the blowing-pipe head each time. According to my invention the carries or carrying-frames holding the glass layers are not attached to a vertically-movable blowing-pipe head but to a vertically-movable carrier which is provided with an electromagnetic, heat-proof clutch-device, with which carrying-frames of optional form and weight can be seized, held and released without loss of time.

In order that the invention may be clearly understood I will now explain the same with reference to the accompanying drawings in which several embodiments of my device are represented by way of example.

Figure 5:
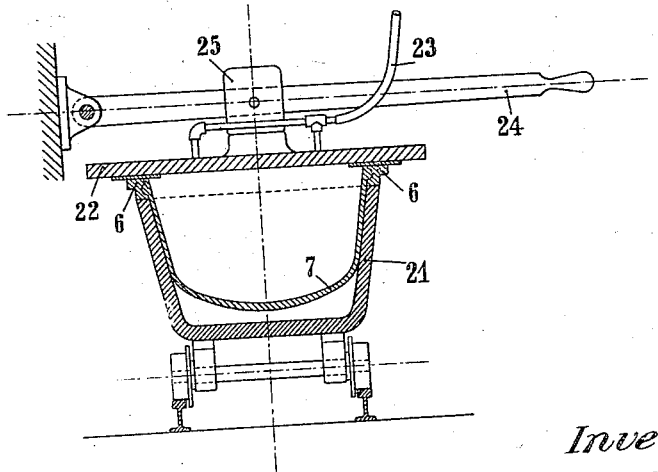

In said drawings:—Figures 1 and 2 are vertical sectional elevation, and top plan view, respectively, of one form of my clutch-device and Figs. 3, 4 and 5 are vertical sectional elevations illustrating various modes of employing the electromagnetic device and the carrying-frame.

Referring to the drawing and firstly to Figs. 1 and 2, 1 designates a vertically-movable, revoluble shaft which is mounted suitably in the frame of the machine. To this shaft is fixed a cast-iron carrier 2. This carrier is a perforated iron body 2 having a magnet winding 15 which enables a pair of magnetic poles to be produced at 16—160. The various portions of the poles 16 and 160 are disposed in the same plane. These poles will readily attract and hold a frame of magnetic metal when this is of some configuration differing from that of the poles. The configuration of the poles shown is annular, such configuration of magnet poles affords a pair of poles of opposite signs at every portion about its active face which will enable it to operate upon any form of object to be lifted but is particularly useful since it can engage at its sides a piece of magnetic metal of different configuration. The poles 16 and 160 are disposed in the same plane and are continuous and are spaced apart and in the interspace is located the winding or coil 15. The carrier arm 1, is provided with an axial passage through which wires 26 and 27 pass, said wires coming out at the bottom of said carrier and passing radially along the arms 2, of said carrier to the magnetic winding 15, thus supplying said magnetic winding with an electric current. With the aid of such an electromagnetic device carrying-frames of different shape—the frame 6 here shown in Figs. 1 and 2 being that required for use in making a bath 7 of glass according to the described process—can be suspended most rapidly and most simply from the carrier and released from it, simply by closing and opening the electric circuit. It is to be understood that the magnet winding 15 must be so fireproof that it can resist the action of the heat in the heating-chamber.

Figs. 3 to 5 show various modes of employing the electromagnetic carrier. In Fig. 3 a part 17 of the machine-frame is illustrated, in which the shaft 1 is suspended. This shaft is provided with an electromagnetic carrier which is made exactly in accordance with the form shown in Fig. 1 and from which a carrying-frame 6 holding the previously-shaped glass body 7 is suspended. The magnetic carrying frame 6, which is composed preferably of iron, is provided with grooves 28, or other suitable holding means, said grooves being adapted to retain the previously shaped plastic mass. The full lines show the machine in its position the moment before the glass body 7 is lowered, by lowering shaft 1, into the heating-chamber 19 provided with the folding cover 18, whereas the dotted lines indicate the carrier lowered with the glass body into the heating-chamber.

Figs. 4 and 5 represent two different constructional forms for finishing blowing the glass body 7 removed from the carrier. Fig. 4 shows how the frame 6 detached from the carrier is suspended freely with the glass sack 7 on a traveling frame 20, after it has been blown out in known manner by means of a wet asbestos plate 21ª.

Fig. 5 shows the finishing blowing of the glass sack 7 placed with the frame 6 on a blowing mold 21; this is done by the mold 21 being tightly closed by a plate 22. Compressed air or tensioned steam is admitted through this plate by means of a pipe or hose 23. In this event the plate 22 is pressed down by the lever 24 loaded by a weight 25 which rests on a shoulder on the plate 22. It is to be understood that this pressure may be brought about by counterweights, hydraulic pressure and in other known ways. Also, the vessels may be blown in known manner by means of a wet asbestos cover instead of by air or steam pressure. Also, the finishing blowing of the glass body can be done directly under the carrier, e. g. with a wet asbestos cover as illustrated in Fig. 4, or the blowing mold with the glass sack may be removed from under the carrier and then blown, as shown in Fig. 5. After the blowing is finished the hollow glass body together with its carrying-frame may be again connected to the carrier in order to heat once more in the heating-chamber the outside surfaces of the hollow glass body which have been cooled suddenly by iron surfaces.

I claim:—

In a machine of the character described for making hollow glass bodies, the combination of an iron carrying frame, provided with means adapted to hold a mass of plastic glass, a reciprocatory carrier therefor, and an electromagnetic device mounted on the carrier for attracting and suspending said frame from said carrier.

In witness whereof I have hereunto set my hand this 17th day of April 1909 in the presence of the two subscribing witnesses.

PAUL THEODOR SIEVERT.

Witnesses:
V. BROCOE,
PAUL ARRAS.